(12) United States Patent
Kawamura et al.

(10) Patent No.: US 6,312,038 B1
(45) Date of Patent: Nov. 6, 2001

(54) AUTOMOTIVE VEHICLE BODY STRUCTURE

(75) Inventors: Yasushi Kawamura; Tatsuo Iwabe; Takahiro Kamei; Makoto Tsuruta; Yasuki Motozawa; Kazuya Yoshida, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/621,336

(22) Filed: Jul. 21, 2000

(30) Foreign Application Priority Data

Jul. 23, 1999 (JP) .................................. 11-208865
Jul. 23, 1999 (JP) .................................. 11-208910

(51) Int. Cl.⁷ ..................................................... B60N 2/42
(52) U.S. Cl. ..................... 296/68.1; 296/189; 297/216.1; 297/216.16; 297/216.18
(58) Field of Search ............................... 296/68.1, 65.02, 296/189, 188; 297/216.1, 216.16, 216.13, 216.18

(56) References Cited

U.S. PATENT DOCUMENTS

| 3,001,815 | * | 9/1961 | Weber ................................. 296/68.1 |
| 3,992,046 | | 11/1976 | Braess ................................. 296/68.1 |
| 5,409,262 | | 4/1995 | McLennan ........................... 280/784 |
| 5,626,203 | | 5/1997 | Habib ................................. 180/274 |
| 5,636,424 | | 6/1997 | Singer et al. ...................... 29/407.01 |
| 5,947,543 | * | 9/1999 | Hubbard ............................. 296/68.1 |
| 6,092,853 | * | 7/2000 | Hubbard ............................. 296/68.1 |

FOREIGN PATENT DOCUMENTS

| 3424928-A | * | 1/1986 | (DE) ................................. 297/216.8 |
| 43 23 543 C | | 10/1994 | (DE) . |
| 199 38 940 A | | 3/2000 | (DE) . |
| 7-101354 | | 4/1995 | (JP) . |

OTHER PUBLICATIONS

Patent Abstracts of Japan, Publication No. 07101354 A, 1995 http://www.patents.ibm.com/cgi-bin/viewpat.cmd/ JP07101354A2.
Translation, DE 43 23 543 C1, Publication Date of the Grant of the Patent: Oct. 6, 1994, 1 page.

* cited by examiner

Primary Examiner—Stephen T. Gordon
Assistant Examiner—Patricia Engle

(57) ABSTRACT

In an automotive vehicle body structure comprising a seat carrying member that is moveable with respect to the main part of the vehicle body at the time of a vehicle crash so as to reduce the peak deceleration of the vehicle occupant in the seat, the seat carrying member comprises an elongated member extending in a fore-and-aft direction of the vehicle body and having a portion adapted to be deformable at the time of a vehicle crash. The seat is preferably connected to the elongated member of the seat carrying member at a widthwise center of the seat so that at the time of a vehicle crash, the inertial force of the seat and the vehicle occupant will act in the direction that the elongated member extends and substantially no horizontal moment will be applied on the seat carrying member. A seat position adjustment mechanism is preferably provided between the seat and the elongated member of the seat carrying member.

7 Claims, 4 Drawing Sheets

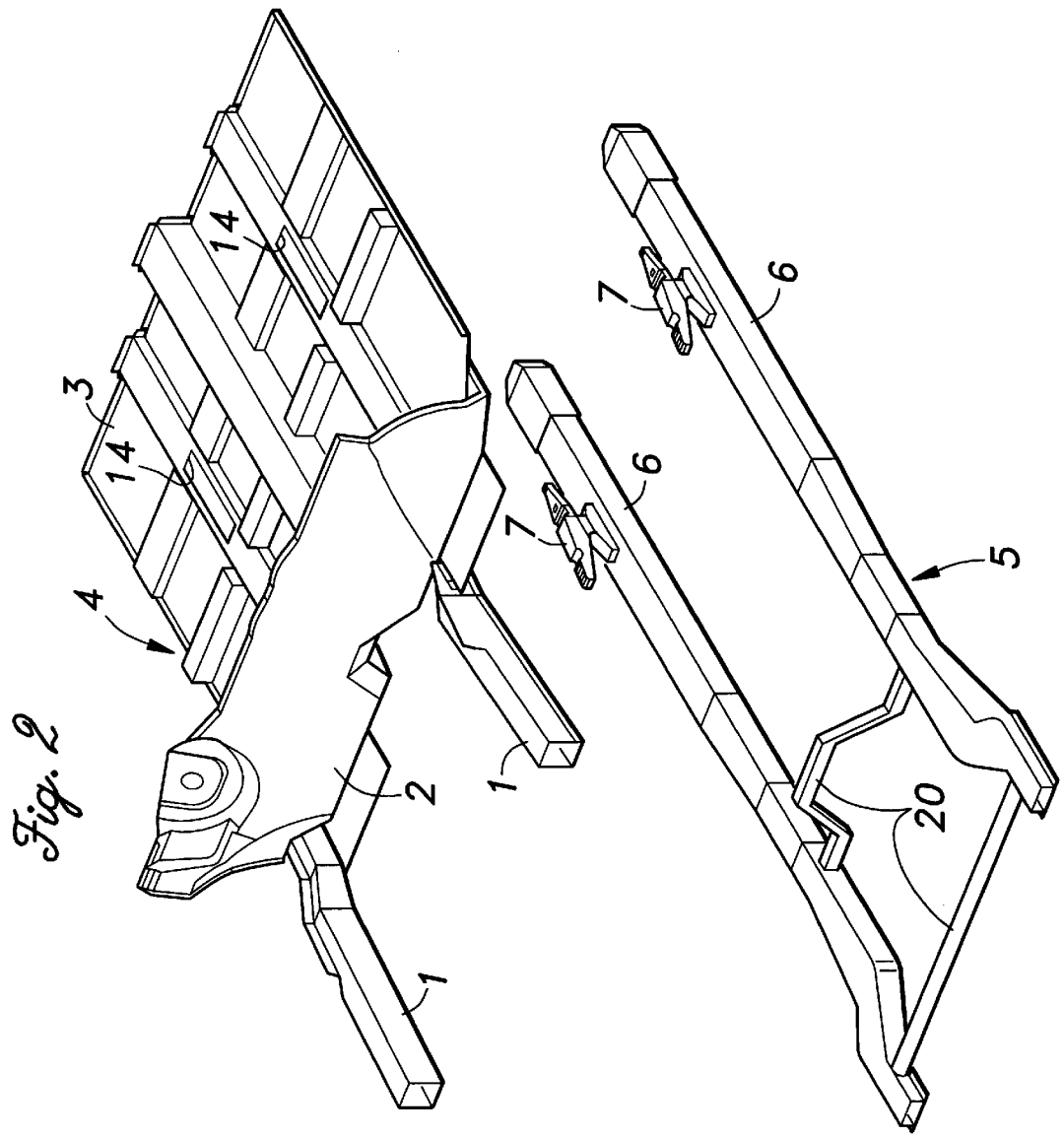

AUTOMOTIVE VEHICLE BODY STRUCTURE

TECHNICAL FIELD

The present invention relates to an improved automotive vehicle body structure for enhancing the protection of vehicle occupants at the time of a vehicle crash while minimizing the vehicle weight.

BACKGROUND OF THE INVENTION

In recent years, various proposals have been made in regard to automotive vehicle body structures to maximize the protection of vehicle occupants at the time of a vehicle crash. For instance, proposals have been made to minimize the deceleration of the part of the vehicle body occupied by vehicle occupants (or passenger compartment) by properly selecting the deformation of the remaining part of the vehicle body, and preventing the former part of the vehicle body from deforming (see Japanese patent laid open publication No. 7-101354, for instance).

However, only with such conventional approaches, it may be difficult to reduce the deceleration of the vehicle occupant in the case of small cars which do not provide adequate deformation strokes of the parts of the vehicle body other than the part occupied by the vehicle occupant.

Further, it is generally impossible to integrally attach a vehicle occupant to a vehicle body even if the seat is fixedly attached to the vehicle body because the seat belt for restraining the vehicle occupant to the seat has an inevitable slack. Thus, when a vehicle crash occurs, the deceleration acting upon the vehicle occupant at the time of a vehicle crash starts rising only after the vehicle occupant is fully restrained by the seat belt. Further, because the seat belt inevitably has a certain resiliency, the deceleration acting on the vehicle occupant, who tends to continue to move forward, reaches a maximum level when the maximum elongation of the seat belt takes place. The maximum deceleration level increases as the forward movement of the vehicle occupant with respect to the vehicle body under the inertial force increases, and is known to substantially exceed the average deceleration of the vehicle body. Therefore, in order to minimize the impact which the vehicle occupant receives at the time of a vehicle crash, it is necessary to minimize the time delay in the rise in the deceleration of the vehicle occupant with respect to the deceleration of the vehicle body and thereby reduce the forward movement of the vehicle occupant with respect to the vehicle body.

Proposals have been made in U.S. Pat. Nos. 6,186,574 and 6,193,296, to impart a relative deceleration and acceleration to the vehicle seat or the member carrying the vehicle seat with respect to the main part of the vehicle body so that the vehicle occupant may experience a deceleration from an early stage of a vehicle crash, and the maximum vehicle occupant deceleration may be reduced by distributing the inertia force acting on the vehicle occupant over a longer period of time. The contents of these applications are hereby incorporated in this application by reference.

In the automotive vehicle body structure proposed in the previous applications, however, it is still desired to minimize the weight of the seat carrying member as well as the strength required thereto so as to reduce the total weight of the vehicle body and the manufacturing cost of the same.

Further, in view of the user's convenience, it is desired that the position of the seat is adjustable at usual times although the seat should be fixed to the seat carrying member at the time of a vehicle crash. It may be conceivable to provide the seat carrying member with a floor panel to mount a pair of guide rails thereon for slideably engaging slide shoes attached to the seat, and to provide a seat position adjustment mechanism to either one of the pair of guide rails. However, such a floor panel and a pair of guide rails provided to the seat carrying member would undesirably increase the weight of the seat carrying member.

BRIEF SUMMARY OF THE INVENTION

In view of the above problems in the prior art, a primary object of the present invention is to provide an automotive vehicle body structure comprising a seat carrying member that is moveable relative to the main part of the vehicle body to effect a desirable deceleration pattern of the seat at the time of a vehicle crash wherein the weight of the seat carrying member is significantly reduced.

A second object of the present invention is to provide such an automotive vehicle body structure wherein the strength required for the seat carrying member is significantly reduced.

A third object of the present invention is to provide such an automotive vehicle body structure which has a seat position adjustment mechanism so as not to deteriorate the vehicle occupant's convenience at usual times and which can achieve a seat deceleration that is effective in reducing the peak deceleration of the vehicle occupant A fourth object of the present invention is to provide an automotive vehicle body structure which is simple in structure, and light in weight.

According to the present invention, these and other objects can be accomplished by providing an automotive vehicle body structure, comprising: a seat (9) which is fitted with a seat belt (8) for restraining a vehicle occupant (P) in the seat; a first member (5) attached to the seat and supported on a vehicle body so as to be moveable in a direction of an input crash load resulting from a vehicle crash, the first member being adapted to deform under the crash load while supporting an inertial force of said seat upon occurrence of the vehicle crash; a second member (4) which is connected to a main part of the vehicle body and adapted to deform under the crash load while supporting an inertial force of the vehicle body; and force generating means (11) for applying a force opposing said crash load to said first member with a certain time delay after the occurrence of the vehicle crash, wherein said first member comprises an elongated member (6) extending substantially in a fore-and-aft direction of said vehicle body, said elongated member having a portion adapted to substantially deform only after said force opposing the crash load is applied to said first member by said force generating means upon occurrence of the vehicle crash.

In this way, since a substantial part of the first member can be constituted by the longitudinally extending elongated member containing a deformable portion, the weight of the first member (or seat carrying member) can be minimized. The portion adapted to substantially deform may typically comprise a front portion of the elongated member of the first member.

Preferably, said seat is connected to said elongated member of said first member at a point substantially beneath a widthwise center of said seat so that at the time of a vehicle crash, the inertial force of the seat and the vehicle occupant will act in the direction that the elongated member of the first member extends and substantially no horizontal moment will be applied on the first member to thereby achieve reduction in the strength required for the first member.

It is also preferable if a seat position adjustment mechanism (15, 16) is provided between said seat and said elongated member of said first member. Typically, said seat position adjustment mechanism comprises a latch finger (15) and a rack member (16). The seat position adjustment mechanism provided between the seat and the elongated member of the first member allows adjustment of the position of the seat at usual times and in case of a crash, functions to connect the first member and the seat integrally so that precise control of the seat deceleration can be achieved.

More preferably, a guide rail (12) for engaging a slide shoe (13) provided to the seat is secured on said second member so as to guide a position adjustment movement of said seat relative to said first member. Such an arrangement, in combination with the seat position adjustment mechanism provided between the seat and the elongated member of the first member, can allow the first member not to be equipped with a floor panel and a seat slide guide rail for seat position adjustment, contributing to further reduction in the weight of the first member.

Typically, said second member has a floor panel (3), and said seat is arranged on an upper side of said floor panel while said first member is arranged on an under side of said floor panel. The first member may constitute a sub-frame for a front wheel suspension system.

BRIEF DESCRIPTION OF THE DRAWINGS

Now the present invention is described in the following with reference to the appended drawings, in which:

FIG. 2 is an exploded perspective view showing an essential part of the vehicle body structure according to the present invention.;

DETAILED DESCRIPTION OF THE PREFERRED EMBODIMENTS

Figure 1:
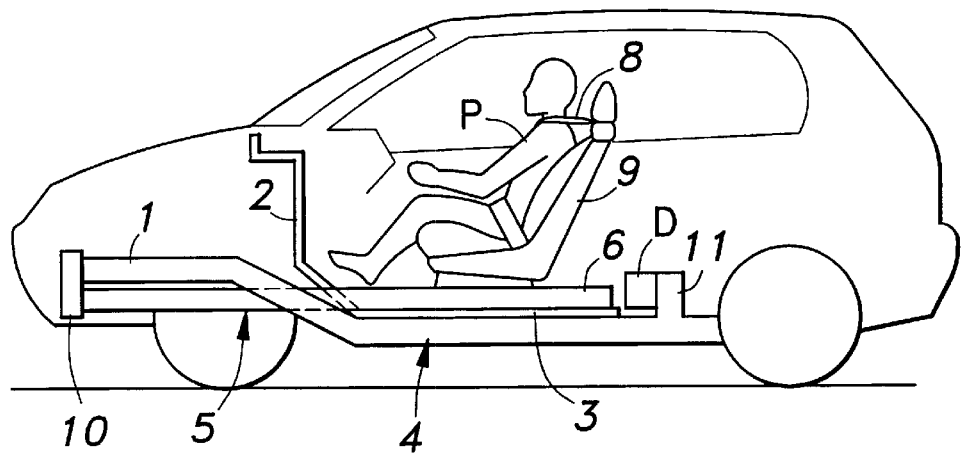
FIG. 1 is a schematic diagram of an automotive vehicle body structure to which the present invention is applied.

FIG. 1 schematically illustrates a vehicle body structure to explain the principle of the present invention. As also seen in FIG. 2 showing an essential part of the vehicle body structure more concretely, the illustrated vehicle body structure is divided into a main frame 4, which comprises side frames 1 extending in the fore-and-aft direction of the vehicle body, a front dashboard 2 and a front floor (or floor panel) 3, and a control frame 5 which is disposed under the front floor 3 of the main frame 4 and is moveable with respect to the main frame 4 in the rearward direction over a certain stroke. Thus, in the illustrated embodiment, the control frame 5 serves as a first member and the main frame 4 serves as a second member. It should be noted that in the schematic diagrams of FIG. 1 and FIGS. 4a–4c, the positional relationship of the component parts may not be accurate. For example, the control frame 5 is shown disposed over the front floor 3 in these diagrams in order to avoid overlap of the control frame 5 with the main frame 4 and show the control frame 5 clearly.

The control frame 5 comprises a pair of substantially straight, elongated members 6 which are disposed beneath the widthwise (or lateral) centers of the driver's seat and the passenger seat, respectively, and extend in the fore-and-aft direction of the vehicle body. As described more in detail later, a front portion of each of the pair of elongated members 6 is adapted to be deformable so as to absorb an impact energy resulting from a vehicle crash and at the same time produce a temporal rearward movement of the control frame 5 relative to the main frame 4 upon occurrence of a vehicle crash. The pair of elongated members 6 are connected to each other by cross bars 20 to form the ladder-like control frame 5. Thus, a substantial part of the control frame 5 is constituted by the pair of elongated members 6 without a floor panel whereby the weight of the control frame 5 is significantly reduced. On a rear portion of each elongated member 6 is fixedly provided a stay 7 to which a seat 9 is connected (described in more detail later), with both ends of a seat belt 8 for restraining a vehicle occupant P is connected to the seat 9.

The front ends of the left and right side frames 1 of the main frame 4 and those of the elongated members 6 of the control frame 5 are joined by a front member 10 extending in a lateral direction of the vehicle body.

The front portions of the left and right side frames 1 of the main frame 4 as well as the front portions of the elongated members 6 of the control frame 5 undergo a compressive deformation under the crash load at the time of a vehicle crash, and thereby perform the function of reducing the deceleration acting on the passenger compartment of the vehicle and absorbing the impact energy before the deformation of the passenger compartment begins. It should be noted that the front portions of the elongated members 6 of the control frame 5 are adapted to be less deformable than those of the side frames 1 of the main frame 4 at the time of a vehicle crash so as to optimize the deceleration pattern of the control frame 5 and hence the seat 9, as described in detail with reference to FIGS. 4a–4c later.

Part of the main frame 4 opposing the rear ends of the elongated members 6 of the control frame 5 is provided with a stopper 11 for limiting the rearward movement of the control frame 5 and acting as a force generating means for applying a forward force to the control frame 5. A front surface of the stopper 11 opposing the rear ends of the elongated members 6 is provided with a damper member D for appropriately adjusting the negative deceleration (acceleration) applied on the control frame 5.

Figure 3:
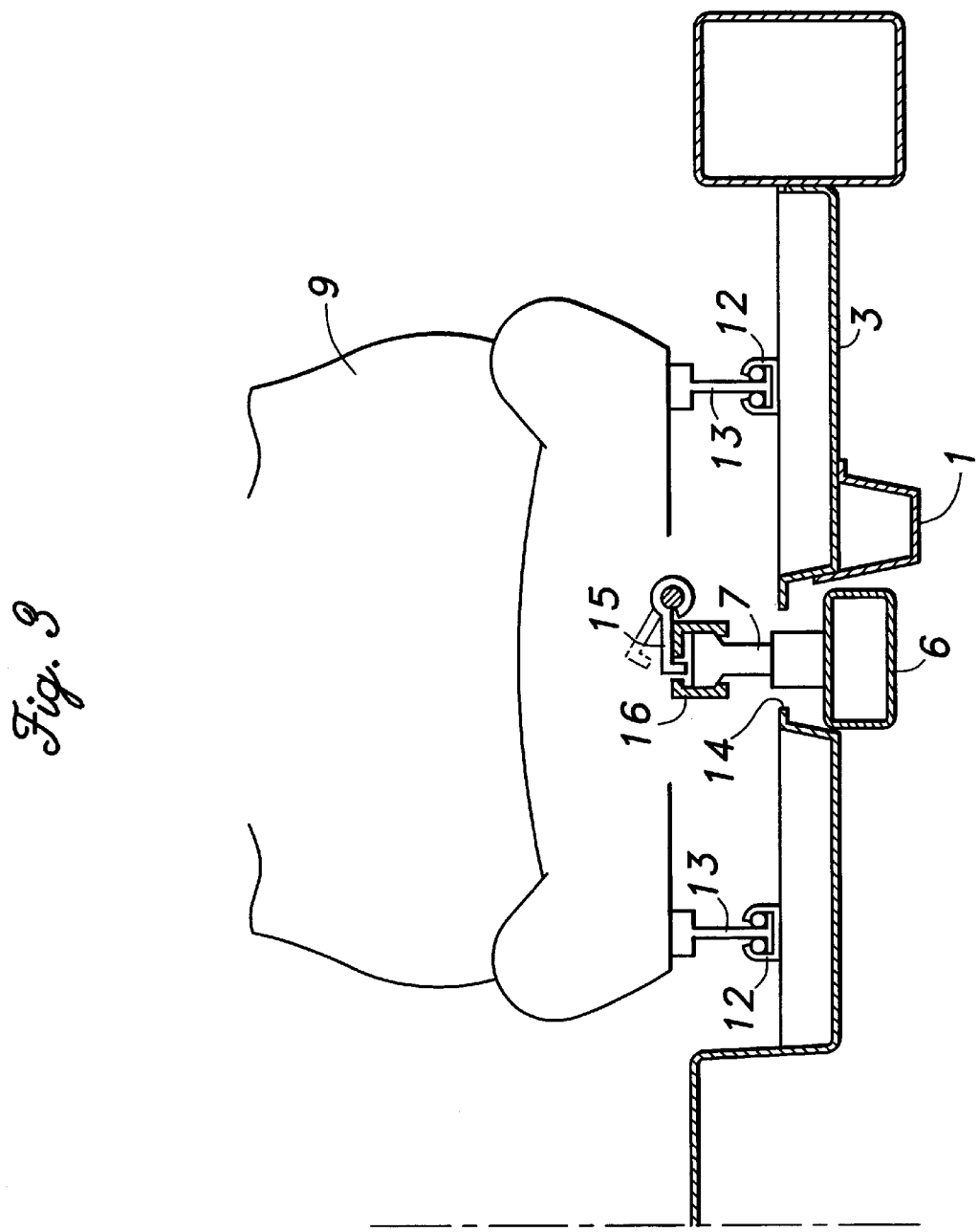
FIG. 3 is a lateral cross-sectional view for showing the seat mounting structure.

As shown in FIG. 3, two (left and right) pairs of seat slide guide rails 12 are secured on the front floor 3 of the main frame 4. The left and right pairs of guide rails 12 each extend in the fore-and-aft direction, and slideably engage slide shoes 13 that are secured underside the corresponding seat 9. In this way, each seat 9 (the driver's seat and passenger seat) is moveable in the fore-and aft direction on the front floor 3 within a range defined by the guide rails 12.

The stays 7 secured to the elongated members 6 are passed into the vehicle compartment through openings 14 formed in the front floor 3. On top of each stay 7 is attached a rack member 16 that is engaged with a latch finger 15 pivotably connected to the seat 9 for securing the seat at an adjusted position. It should be noted that the seat position adjustment mechanism may not be limited to the combination of the latch finger 15 and the rack member 16, and any other seat position adjustment mechanism known in public may be adopted.

An important feature which should be mentioned here is that each of the pair of longitudinally extending elongated members 6 passes just below the widthwise center or the center of gravity of the corresponding seat 9 and the seat position adjustment mechanism (latch finger 15, rack member 16) is provided between the seat 9 and the corresponding elongated member 6 of the control frame 5 so that the position of each seat 9 is made adjustable with respect to the control frame 5. In this way, since the inertial force of the seats 9 and the vehicle occupant P will act in the direction that the elongated members 6 of the control frame 5 extend and substantially no horizontal moment will be applied on the control frame 5, the strength required for the elongated members 6 of the control frame 5 can be advantageously reduced. Further, the seat position adjustment mechanism provided between the seat 9 and the elongated member 6 of the control frame 5 allows adjustment of the position of the seat 9 at usual times and in case of a crash, functions to connect the control frame 5 and the seat 9 integrally so that precise control of the seat deceleration can be achieved. Since the control frame 5 does not need to be equipped with a floor panel and a pair of seat slide guide rails for the purpose of seat position adjustment, the weight of the control frame 5 is significantly reduced.

Although not shown in the drawings, the control frame 5 may be preferably used as a sub-frame for a front wheel suspension system.

Figure 5:
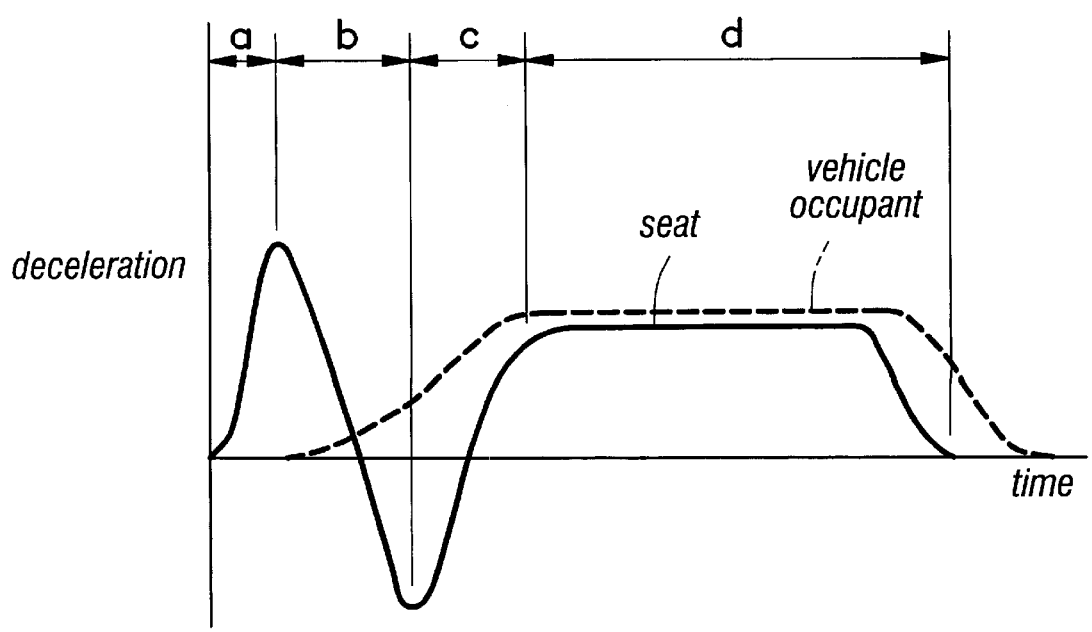
FIG. 5 is a graph showing a desirable time history of the decelerations of the seat and the vehicle occupant.

Now, the mode of operation of the system of the present invention is described in the following with respect to a case of a frontal crash onto a fixed structure on the road with reference to FIGS. 4a–4c and FIG. 5. In FIG. 5, the solid line represents the deceleration of the seat while the broken lines represent the vehicle occupant deceleration.

Figure 4A:
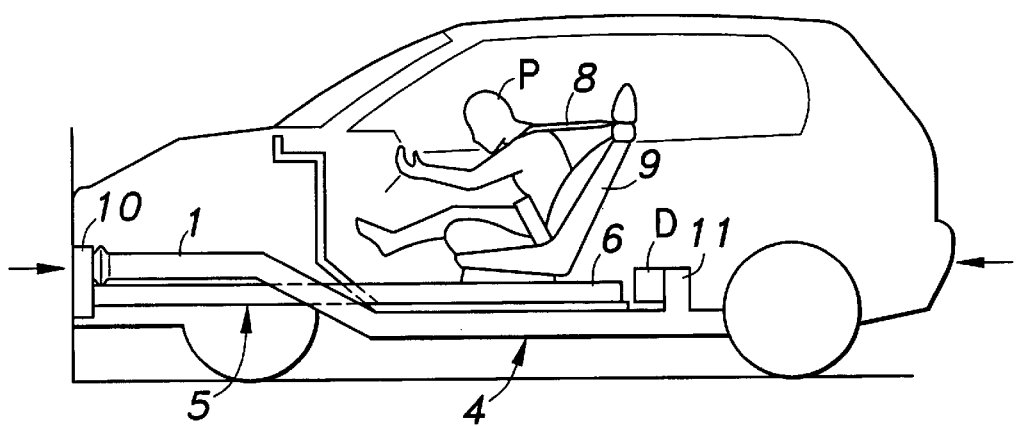
FIGS. 4a–4c are schematic side views similar to FIG. 1 for explaining mode of operation in a vehicle crash.

At the moment of a vehicle crash, the deformation of the vehicle body starts from the deformation of the front portions of the side frames 1 of the main frame 4 and the elongated members 6 of the control frame 5. Because the mass of the control frame 5 is substantially small as compared with the deformation stress that is produced in the front portion of the control frame 5, the seat 9 connected to the control frame 5 starts decelerating earlier at a deceleration level which builds up more rapidly and sharply than the main frame 4 (interval "a" of FIG. 5). Thus, the seat 9 apparently moves rearward relative to the front floor 3 of the main frame 4 which continues to move forward due to the compressive deformation of the side frames 1 (FIG. 4a).

Under this condition, the vehicle occupant P tends to move forward under the inertial force, but because the seat 9 which is integral with the corresponding elongated member 6 instantly moves rearward with respect to the front floor 3, the restraining force of the seat belt 8 on the vehicle occupant P increases, and the forward movement of the vehicle occupant P is restrained.

Figure 4B:
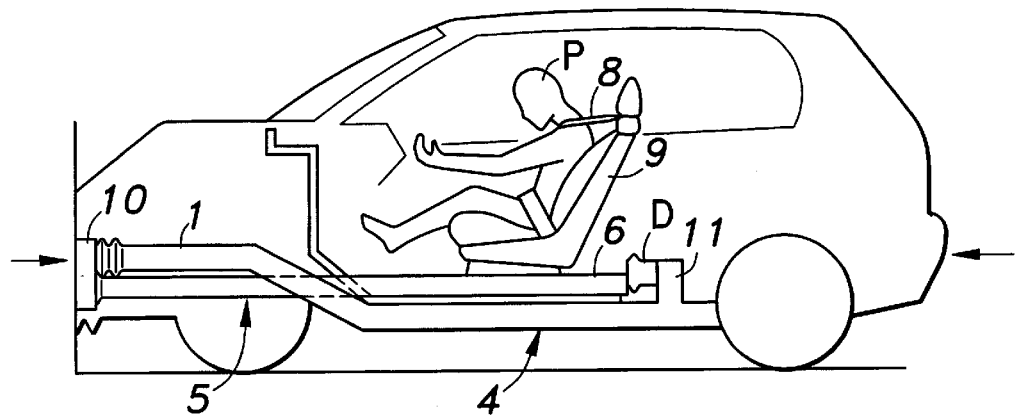
Figure 4C:
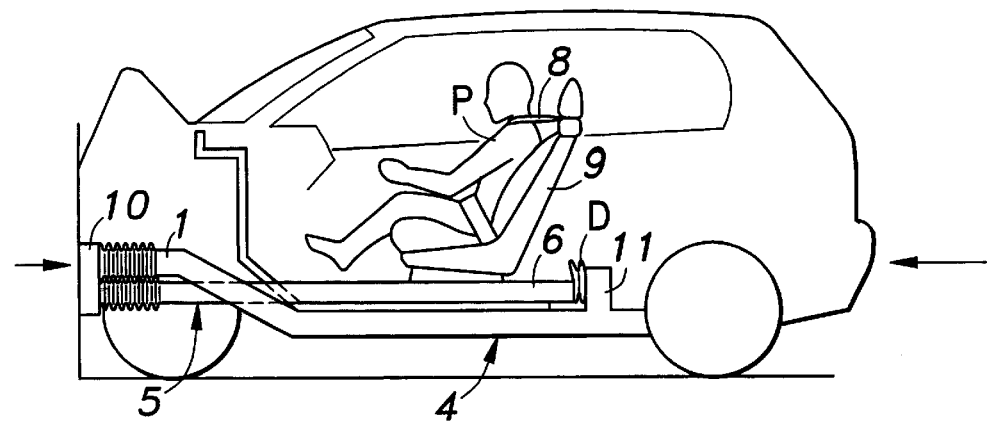

In the intermediate phase of the crash, the rear ends of the elongated members 6, which have been subjected to a large deceleration due to the resistance of the front portions thereof against deformation, strike upon the stopper 11 (damper member D) of the main frame 4 which continues to move forward due to the compressive deformation of the side frames 1 (FIG. 4b). As a result, the inertial force of the main frame 4 is transmitted to the control frame 5, with the relative rearward movement of the elongated members 6 with respect to the front floor 3 continuing until the deformation of the damper member D is completed. Thus, a force opposing the action of the crash road that is acting on the main frame 4 is applied on the seat 9 via the stopper 11 and the elongated member 6 so that the resulting forward acceleration of the seat 9 during the crash process cancels the forward inertial force acting on the vehicle occupant P (interval "b" of FIG. 5). As the deformation of the damper D is completed, the stopper 11 abutting the rear ends of the elongated members 6 of the control frame 5 prevents any further rearward movement of the control frame 5 relative to the main frame 4 so that the control frame 5 carrying the seat 9 begins to decelerate jointly with the main frame 4 (interval "c" of FIG. 5).

In the final phase of the crash (FIG. 4c), as a result of the above described process, the relative speed between the seat 9 and the main frame 4 has been reduced to zero and the restraining load of the seat belt 8 balances out with the deceleration level of the seat 9 whereby the vehicle occupant P decelerates integrally with the main frame 4 and the seat 9. This state is maintained until the vehicle body comes to a complete stop (interval "d" of FIG. 5).

Thus, by effecting a time history of seat deceleration (solid line in FIG. 5) in a manner that a deceleration higher than the average vehicle body deceleration is applied to the seat 9 for a short period of time in an initial phase of a vehicle crash, and following a short interval of applying a reverse deceleration (acceleration) to the seat 9, a same deceleration as the average vehicle body deceleration is applied to the seat 9, the vehicle occupant can experience a deceleration from an early stage of the vehicle crash and the inertial force acting on the vehicle occupant can be distributed over a relatively long period of time whereby a preferable vehicle occupant deceleration without an excessive peak (broken lines in FIG. 5) can be achieved.

As explained above, according to the present invention, the control frame 5 carrying the seat 9 comprises an elongated member 6 extending in the fore-and-aft direction of the vehicle body and having a portion adapted to be deformable at the time of a vehicle crash so that the mass of the control frame 5 is minimized. The minimized mass of the control frame 5 can in turn reduce the weight of the force generating means (stopper 11) for applying an acceleration to the seat 9 which is substantially integral with the control frame 5. Further, by connecting the seat 9 to the control frame 5 at a point just below the widthwise center or the center of gravity of the seat 9, it is possible to prevent the inertial force of the seat 9 and the vehicle occupant P from acting on the control frame 5 as a moment, thereby contributing to reduction in the strength or weight required for the control frame 5. Thus, the present invention is quite effective in decreasing the weight of the vehicle body and reducing the manufacturing cost of the same.

Further, owing to the seat position adjustment mechanism provided between the seat 9 and the elongated member 6 of the control frame 5 in combination with the arrangement that the guide rails 12 are secured on the front floor 3 of the main frame 4 so as to slideably engage the slide shoes 13 secured underside the seat 9, the control frame 5 need not have a floor panel and a pair of seat slide guide rails for seat position adjustment, allowing further reduction in the weight of the control frame 5.

Although the present invention has been described in terms of preferred embodiments thereof, it is obvious to a person skilled in the art that various alterations and modifications are possible without departing from the scope of the present invention which is set forth in the appended claims.

What is claimed is:

1. An automotive vehicle body structure, comprising:
   a seat which is fitted with a seat belt for restraining a vehicle occupant in the seat;
   a first member attached to the seat and supported by on a vehicle body so as to be moveable in a direction of an input crash load resulting from a vehicle crash, the first member being adapted to deform under the crash load while supporting an inertial force of said seat upon occurrence of the vehicle crash;

a second member which is connected to a main part of the vehicle body and adapted to deform under the crash load while supporting an inertial force of the vehicle body, the second member having a floor panel; and force generating means for applying a force opposing said crash load to said first member with a certain time delay after the occurrence of the vehicle crash, wherein said first member comprises an elongated member extending substantially in a fore-and-aft direction of said vehicle body, said elongated member having a portion adapted to substantially deform only after said force opposing the crash load is applied to said first member by said force generating means upon occurrence of the vehicle crash, the first member being disposed under the second member and provided with a stay which extends through an opening formed in the floor panel and is connected to the seat.

2. An automotive vehicle body structure according to claim 1, wherein said portion adapted to substantially deform comprises a front portion of said elongated member.

3. An automotive vehicle body structure, comprising:

a seat which is fitted with a seat belt for restraining a vehicle occupant in the seat;

a first member attached to the seat and supported by on a vehicle body so as to be moveable in a direction of an input crash load resulting from a vehicle crash, the first member being adapted to deform under the crash load while supporting an inertial force of said seat upon occurrence of the vehicle crash;

a second member which is connected to a main part of the vehicle body and adapted to deform under the crash load while supporting an inertial force of the vehicle body, the second member having a floor panel; and force generating means for applying a force opposing said crash load to said first member with a certain time delay after the occurrence of the vehicle crash, wherein said seat is connected to said elongated member of said first member at a point substantially beneath a widthwise center of said seat.

4. An automotive vehicle body structure, comprising:

a seat which is fitted with a seat belt for restraining a vehicle occupant in the seat;

a first member attached to the seat and supported by on a vehicle body so as to be moveable in a direction of an input crash load resulting from a vehicle crash, the first member being adapted to deform under the crash load while supporting an inertial force of said seat upon occurrence of the vehicle crash;

a second member which is connected to a main part of the vehicle body and adapted to deform under the crash load while supporting an inertial force of the vehicle body, the second member having a floor panel; and force generating means for applying a force opposing said crash load to said first member with a certain time delay after the occurrence of the vehicle crash, wherein a seat position adjustment mechanism is provided between said seat and said elongated member of said first member.

5. An automotive vehicle body structure according to claim 4, wherein said seat position adjustment mechanism comprises a latch finger and a rack member.

6. An automotive vehicle body structure according to claim 4, wherein a guide rail for engaging a slide shoe provided to the seat is secured on said second member so as to guide a position adjustment movement of said seat relative to said first member.

7. An automotive vehicle body structure, comprising a seat which is fitted with a seat belt for restraining a vehicle occupant in the seat;

a first member attached to the seat and supported by on a vehicle body so as to be moveable in a direction of an input crash load resulting from a vehicle crash, the first member being adapted to deform under the crash load while supporting an inertial force of said seat upon occurrence of the vehicle crash;

a second member which is connected to a main part of the vehicle body and adapted to deform under the crash load while supporting an inertial force of the vehicle body, the second member having a floor panel; and force generating means for applying a force opposing said crash load to said first member with a certain time delay after the occurrence of the vehicle crash, wherein said first member constitutes a sub-frame for a front wheel suspension system.

* * * * *